United States Patent [19]
Shigemori et al.

[11] 3,807,417
[45] Apr. 30, 1974

[54] DEVICE FOR CHECKING AN AMOUNT OF MONEY DESIGNATED TO BE DISPENSED IN AUTOMATIC MONEY DISPENSERS

[75] Inventors: Hideto Shigemori; Motoaki Fukunaga, both of Himeji, Japan

[73] Assignee: Glory Kogyo Kabushiki Kaisha, Shimoteno, Himeji-shi, Hyogo-ken, Japan

[22] Filed: Dec. 6, 1972

[21] Appl. No.: 312,491

[30] Foreign Application Priority Data
Dec. 6, 1971 Japan.................................. 46-98547

[52] U.S. Cl............. 133/1 R, 194/DIG. 9, 235/177, 340/146.2
[51] Int. Cl................................................ G07f 7/00
[58] Field of Search......... 133/1, 2; 194/DIG. 9, 10; 340/146.2; 235/177

[56] References Cited
UNITED STATES PATENTS
3,675,816  7/1972  Bourke ........................ 194/DIG. 9
3,611,293  10/1971  Constable ..................... 194/DIG. 9
3,726,377  4/1973  Nakayasu........................... 194/10

*Primary Examiner*—Stanley H. Tollberg
*Assistant Examiner*—Thomas E. Kocovsky
*Attorney, Agent, or Firm*—Holman & Stern

[57] ABSTRACT

A device for checking registration of an amount of money in a money dispenser which comprises a first storage section for storing the amount of money to be dispensed from the money dispenser, a second storage section capable of storing denominations of money to be dispensed from the money dispenser, and a comparison circuit for comparing the amount of money with the amount of money of a unitary denomination stored in the second storage section, whereby an erroneous registration of the amount of money can be discriminated.

9 Claims, 7 Drawing Figures

DEVICE FOR CHECKING AN AMOUNT OF MONEY DESIGNATED TO BE DISPENSED IN AUTOMATIC MONEY DISPENSERS

BACKGROUND OF THE INVENTION

This invention relates to money dispensers and more particularly to a device for checking registration of an amount of money to be dispensed therefrom (hereinafter referred to as "an error check device").

The invention can be applied to: money dispensers operating in the mode of dispensing money separately according to monetary denominations in which mode an operation of designating monetary denominations (hereinafter referred to as "a denomination designating operation"), an operation of registering an amount of money to be dispensed (hereinafter referred to as "an amount of money registering operation") and an operation of terminating the registration of the amount of money (hereinafter referred to as "a registration ending operation") are carried out in the order stated for every monetary denomination; money dispensers operating in the mode of dispensing money with a minimum number of pieces; and money dispensers operating in both of there modes.

In these money dispensers, if an amount of money registered therein is not an integer multiple of the amount of money of a unitary denomination which, in the case of dispensing money separately according to monetary denominations, is a denomination itself designated and, in the case of dispensing money with a minimum number of pieces, is the lowest of the monetary denominations stored, it is impossible to dispense the money corresponding to the amount of money registered in any of a modes described above.

More specifically, in the money dispenser (dispensing money separately according to monetary denominations) which will dispense money of a single denomination, for instance, 100-yen, an amount of money registered should be equal to $100 \times n$ yen (where $n = 1, 2, 3$ or so on), otherwise it is impossible to dispense the money corresponding to the amount of money registered.

Furthermore, in a money dispenser dispensing money with a plurality of denominations, for instance, 10,000-yen, 1,000-yen and 100-yen in the mode which dispenses money with a minimum number of pieces, an amount of money registered should be equal to $100 \times m$ yen (where $m = 1, 2, 3$, or so on), otherwise it is impossible to dispense the money corresponding to the amount of money registered. In these cases, the amount of money of the unitary denomination is 100 yen.

SUMMARY OF THE INVENTION

It is accordingly a first object of the invention to provide an error check device which will correctly check the fact that it is impossible to dispense money corresponding to an amount of money registered with a monetary denomination or monetary denominations designated according to money dispensing modes and produce an error check signal representing the impossibility.

A second object of the invention is to provide an error check device in which the digits of an amount of money stored in a shift register are read out as a data signal having the digits sequentially arranged beginning with the least significant digit, and the data signal thus read out is compared with a signal corresponding to a monetary denomination of the money to be dispensed, whereby, in the case when the amount of money is not an integer multiple of a unitary denomination of money to be dispensed, which will be correctly discriminated as an error in the registration of the amount of money.

A third object of the invention is to provide an error check device in which the contents in the digits of an amount of money stored in a storage section are sequentially read out and the contents thus read out are compared with the content of a unitary denomination in a comparison circuit.

A fourth object of the invention is to provide an error check device in which the contents in the digits of an amount of money stored in a storage section are simultaneously read out, and the contents thus read out are simultaneously compared with the contents of the amount of money of a unitary denomination for the contents of the digits corresponding to at least the digits of the amount of money of a unitary denomination.

The foregoing objects and other objects as well as specific characters of the invention will become more apparent from the following detailed description and the appended claims when read in conjunction with the accompanying drawings, in which like parts are designated by like numerals or symbols.

DETAILED DESCRIPTION OF THE INVENTION

Figure 1:
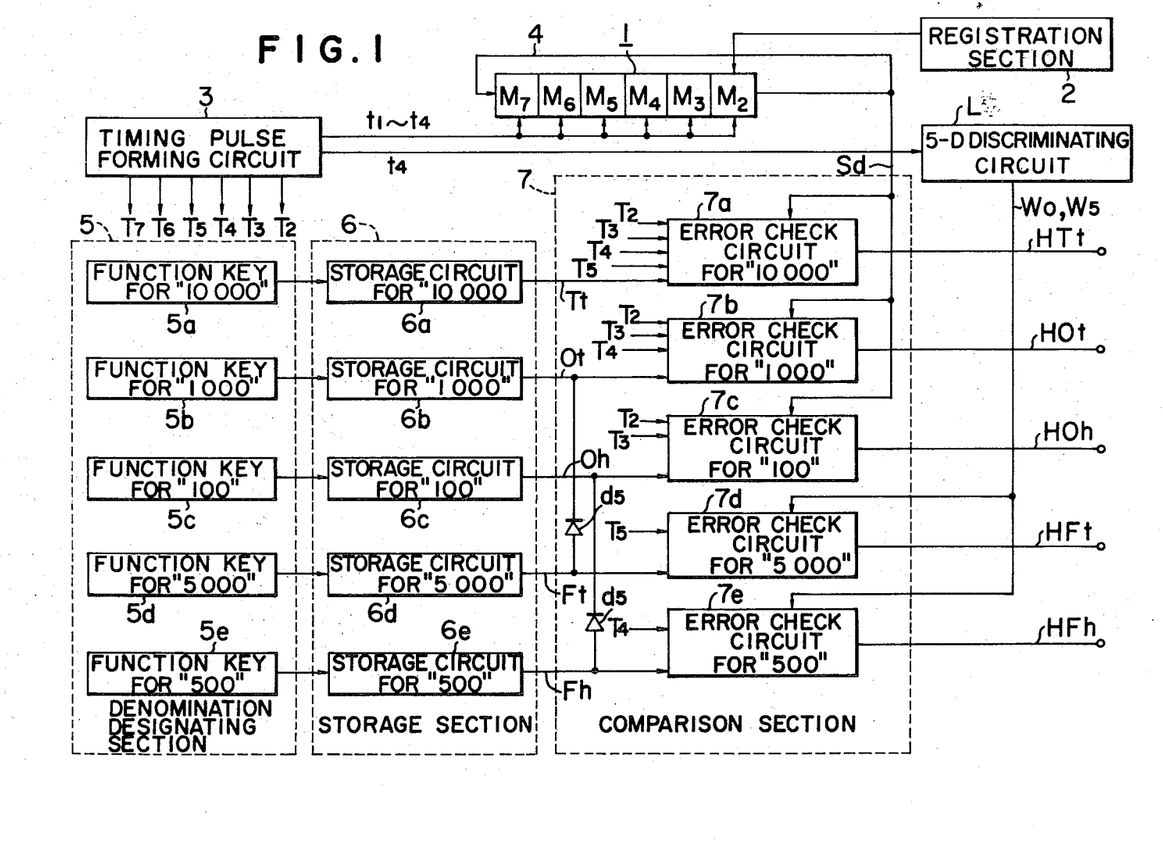
FIG. 1 is a block diagram illustrating one example of the error check device according to the invention.

With reference to FIG. 1, there is shown one example of the error checking device according to the invention, which comprises a section 1 for storing an amount of money to be dispensed (hereinafter referred to as "a storage section 1"). This storage section 1 is a shift register having, for instance, six digits $M_2$ through $M_7$ each of which is constituted by four-bit storage elements.

During the operation for registering the amount of money to be dispensed, the digits of the amount of money delivered from a registration section 2 are sequentially written in the digits of the storage section 1 by beginning with its least significant digit $M_2$.

Under this condition, whenever bit timing pulses $t_1$ through $t_4$ are repeatedly applied to the storage section 1, in the order stated, from a timing pulse forming circuit 3, the contents in the digits of the storage section 1 are sequentially read out by beginning with the least significant digit, with the timing of the bit pulses $t_1$ through $t_4$.

The contents thus read out are fed back through a feedback loop 4 to the most significant digit $M_7$ of the storage section 1, thus being dynamically stored therein.

Furthermore, the timing pulse forming circuit 3 operates to produce digit timing pulses $T_2$ through $T_7$ in the order stated, each having a time width required for one circulation of the bit timing pulses $t_1$ through $t_4$, so that the digits for the places of 1-yen to 100,000-yen in the amount of money stored in the storage section 1 can be sequentially read out by the timing of the digit timing pulses $T_2$ through $T_7$.

The device shown in FIG. 1 further comprises: a section 5 for designating monetary denominations (hereinafter referred to as "a denomination designating section") which has function keys 5a, 5b, 5c, 5d and 5e respectively for monetary denominations "10,000", "1,000", "100", "5,000" and "500"; and a section 6 for storing monetary denominations designated (hereinafter referred to as "a storage section 6") which includes storage circuits 6a, 6b, 6c, 6d and 6e which are provided for storing the monetary denominations "10,000", "1,000", "100", "5,000" and "500" designated by the function keys 5a, 5b, 5c, 5d and 5e, respectively.

These storage circuits 6a through 6e produce signals $Tt$, $Ot$, $Oh$, $Ft$ and $Fh$ of designating the monetary denominations stored (hereinafter referred to as denomination designation signals) in the storage circuits 6a through 6e, respectively.

The apparatus shown in FIG. 1 further comprises a comparison section 7 including error check circuits 7a through 7e separately provided according to the monetary denominations or the denomination designation signals. That is, the error check circuit 7a for the monetary denomination "10,000" (hereinafter referred to as an error check circuit for "10,000" 7a) is provided for the denomination designation signal $Tt$, the error check circuit 7b for the monetary denomination "1,000" (hereinafter referred to as an error check circuit for "1,000" 7b) is provided for the denomination designation signal $Ot$, and so on.

Figure 2:
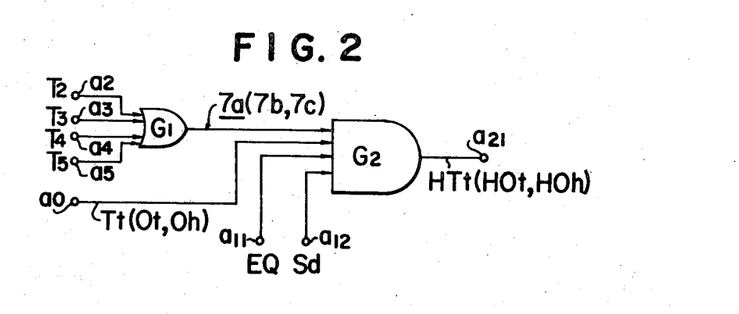
FIGS. 2 and 3 illustrate an error check circuits in dispensing money with monetary denominations "10,000" and "5,000", respectively.

The error check circuit for "10,000" 7a, as shown in FIG. 2, comprises an OR gate G1 with four input terminals and an AND gate G2 with four input terminals. In this circuit 7a, the pulses $T_2$, $T_3$, $T_4$, and $T_5$ are applied to the input terminals $a_2$, $a_3$, $a_4$ and $a_5$ whereby an output at a high level is delivered from the gate $G_1$ to the gate $G_2$. Furthermore, the denomination designation signal Tt from the "10,000" storage circuit 6a, a signal EQ obtained upon termination of the registration and a storage content or data signal Sd read out of the first storage section 1, are respectively applied to the terminals $a_0$, $a_{11}$ and $a_{12}$.

In this error check circuit 7a, when the monetary denomination "10,000" is designated by the monetary denomination designating operation, for instance, in the mode of dispensing money separately according to monetary denominations, the denomination designation signal Tt will be applied to the gate $G_2$ through the terminal $a_0$. Then, the operation for registering the amount of money to be dispensed allows the first storage section 1 to store the amount of money, and the contents of the digits of the amount of money thus stored are sequentially and repeatedly read out, beginning with the least significant digit whenever the pulses $T_2$ through $T_7$ occur. The contents of the digits thus read out are then applied, as the data signal Sd, to the gate $G_2$.

In this case, whenever each of the pulses $T_2$ through $T_5$ is applied to the OR gate $G_1$, a high level output is applied from the OR gate $G_1$ to the AND gate $G_2$ as was described above. Thereafter, the signal EQ is obtained upon termination of registration, and applied to the terminal $a_{11}$ of the AND gate $G_2$. In this case, if there is a bit of a high level in the data signal Sd corresponding to the timing of the pulses $T_2$ through $T_5$, an output of a high level is produced by the AND gate $G_2$ to its output terminal $a_{21}$. This signal is an error check signal HTt for dispensing money with the monetary denomination "10,000."

That is, the production of the error check signal HTt means that the numerals for the places lower than a place of ten thousands in the amount of money stored in the first storage section 1 are not "0" in the decimal number system and it is therefore impossible to dispense an amount of money registered in the places lower than a place of ten thousands with the money of 10,000 yen. Accordingly, it will be immediately discriminated from the production of the signal HTt that there was an erroneous registration of the amount of money to be dispensed.

In addition, in an actual case, the error check signal HTt is introduced to storage means separately provided and is stored therein.

The error check circuit 7b for the monetary denomination "1000," is the same as the error check circuit 7a shown in FIG. 2 except that the OR gate $G_1$ has three input terminals $a_2$, $a_3$ and $a_4$ to which the pulses $T_2$, $T_3$ and $T_4$ are respectively applied and the signal Ot for designating the monetary denomination "1,000" is applied to the terminal $a_0$ of the AND gate $G_2$. Similarly as in the case of the error check circuit 7a, the error check circuit 7b produces an error check signal HOt when money is being dispensed with the monetary denomination "1,000."

Similarly as in the case of the error check circuit 7b, the error check circuit 7c for the monetary denomination "100" is the same as the error check circuit 7a shown in FIG. 2 except that the OR gate $G_1$ has two input terminals $a_2$ and $a_3$ to which the pulses $T_2$ and $T_3$ are respectively applied and the signal Oh for designating the monetary denomination "100" is applied to the input terminal $a_0$ of the AND gate $G_2$, and produces an error check signal HOh in dispensing money with the monetary denomination "100."

Figure 3:
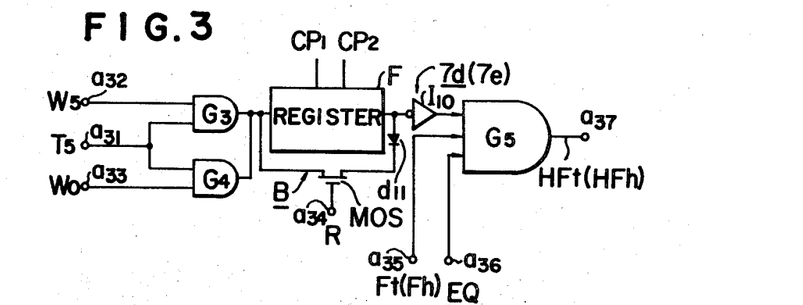

The error check circuit 7d, as shown in FIG. 3, comprises AND gates $G_3$ and $G_4$ each having two input terminals, a third storage circuit B which is a one-bit shift register, an inverter $I_{10}$, and one AND gate $G_5$ with three input terminals.

In this circuit 7d the timing pulse $T_5$ produced from the timing pulse forming circuit 3 is applied to a common terminal $a_{31}$ of the AND gates $G_3$ and $G_4$. An output $W_5$ for discriminating "5" (hereinafter referred to as "a "5" discriminating output $W_5$") is applied from a circuit L for discriminating "5" and "0" (hereinafter referred to as "a 5-0 discriminating circuit L") to a terminal $a_{32}$ of the AND gate $G_3$, while an output for discriminating "0" (hereinafter referred to as "a "0" discriminating output $Wo$") is applied from the 5-0 discriminating circuit L to the terminal $a_{33}$ of the AND gate $G_4$.

Figure 4:
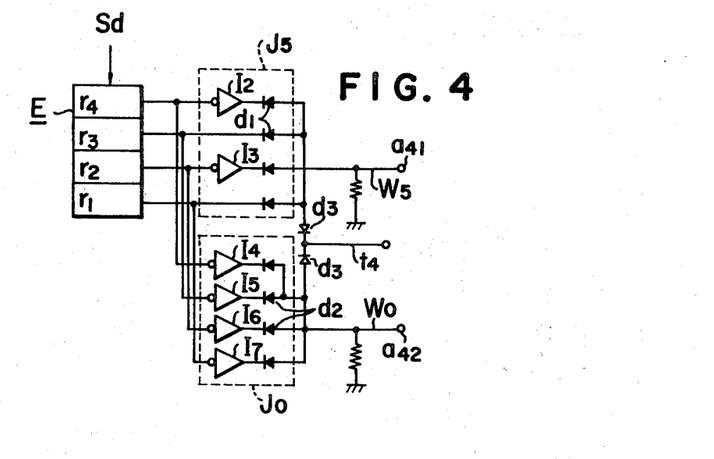
FIG. 4 is a schematic diagram illustrating a circuit for discriminating "5" and "0"

The 5-0 discriminating circuit L, as illustrated in FIG. 4, comprises a shift register E of a four-bit one-digit type, a circuit $J_5$ for forming the "5" discriminating output, and a circuit $J_o$ for forming the "0" discriminating output.

In this circuit L, the bits of the data signal Sd read out of the first storage circuit 1 are sequentially introduced to the bits $r_1$, $r_2$, $r_3$ and $r_4$ of the register E whenever the pulses $t_1$ through $t_4$ are obtained, and the contents thus stored in the bits $r_1$, $r_2$, $r_3$ and $r_4$ are applied to the circuit $J_5$ comprising inverters $I_2$ and $I_3$ and diodes $d_1$ and also to the circuit Jo comprising inverters $I_4$, $I_5$, $I_6$ and $I_7$ and diodes $d_2$. When the pulse $t_4$ produced from the timing pulse forming circuit 3 is applied through diodes $d_3$ to the output sides of the circuits J and $J_5$ and $J_o$, if the content of the register E is representative of a numeral "5" in the decimal number system the "5" discriminating output $W_5$ of a high level is produced to a terminal $a_{41}$ of the circuit $J_o$, and if the content of the register E is representative of a numeral "0" in the decimal number system the "0" discriminating output Wo is produced to a terminal $a_{42}$ of the circuit $J_o$.

Referring back to FIG. 3, the outputs of the AND gates $G_3$ and $G_4$ are applied to the storage circuit B comprising a register F. Only when the output of the gate $G_3$ or $G_4$ is at a high level, the storage circuit B will write this output with the aid of a clock pulse $CP_1$, and produce a high level output with the aid of another clock pulse $CP_1$ of which the occurrence is later by the time for one bit than that of the clock pulse $CP_1$. The high level output thus produced is applied, as a low level output, through an inverter $I_{10}$ to an AND gate circuit $G_5$.

Furthermore, the high level output of the register F is fed back to the input side of the registor F through a diode $d_{11}$ and an MOS transistor MOS, as a result of which the operating condition, described above, of the storage circuit B is maintained unchanged until the state of the transistor MOS is changed nonconductive by a reset signal R applied to a terminal $a_{34}$ of the transistor MOS. The signal Ft for designating the monetary denomination "5,000" and the signal EQ obtained by the registration terminating operation are respectively applied to terminals $a_{35}$ and $a_{36}$ of the AND gate $G_5$.

In this error check circuit 7d, during the timing period of the pulse $T_5$, the content stored in the digit "1000" of the storage section 1 is written one bit by one bit in the registor E of the 5-0 discriminating circuit L whenever the pulses $t_1$ through $t_4$ are obtained, thereby being filled in the register E at the timing instant of the pulse $t_4$.

In this case, if the content in the registor E is not "5," no "5" discriminating output $W_5$ will be obtained. Similarly, if the content in the register E is not "0," no "0" discriminating output $W_o$ will not be obtained. Therefore, since the pulse $T_5$ is applied to the gates $G_3$ and $G_4$ but the output $W_5$ or $W_o$ is not applied thereto, the storage circuit B will not carry out its storage operation and a high level output obtained by the inverter $I_{10}$ is applied to the AND gate $G_5$. Accordingly, similarly as in the case described with reference to FIG. 2, if the denomination designation signal Ft is applied to the gate $G_5$, a high level output will be produced by the gate $G_5$ at the instant the signal EQ is applied to the same.

The high level output thus produced in an error check signal HFt in dispensing money with the monetary denomination "5,000." The production of the error check signal HFt means that a numeral for a place of thousands of the amount of money to be issued is neither "5" for "0." Therefore, the amount of money registered, in this case, cannot be dispensed with 5,000-yen money. Thus, it can be immediately detected from the production of the signal HFt that the registration of the money to be issued was erroneously made.

Furthermore, in the case of checking registration of an amount of money to be dispensed, by means of the error check circuit 7d, the denomination designation signal Ft is further applied to the error check circuit 7b through a diode $d_5$ (FIG. 1). In this case, similarly as in the case described with reference to FIG. 2, if numerals on the places lower than a place of thousands are not "0" in the decimal number system, the error check signal HOt is produced from the error check circuit 7b, whereby an erroneous registration of an amount of money in dispensing 5,000-yen money can be correctly discriminated.

The error check circuit 7e for the monetary denomination "500" is the same in composition as the circuit shown in FIG. 3 except that the pulse $T_4$ is applied to the common terminal $a_{31}$ and the denomination designation signal Fh is applied to the terminal $a_{35}$. An erroneous registration of an amount of money in dispensing money with the monetary denomination "500" can be discriminated in the same manner as in the case of dispensing money with the monetary denomination "5,000."

In the case of using the error check device in the mode of dispensing money with a minimum number of pieces, since the operation for designating monetary denominations is unnecessary in this mode, instead of the signal Fh for designating the monetary denomination "500" a signal, obtained additionally, representative of a monetary denomination stored is applied to an error check circuit for dispensing money with a minimum monetary unit or the error check circuit 7e through its terminal $a_{35}$ so that an erroneous registration of an amount of money can be checked in the same manner as described above.

According to the example of the invention described with reference to FIG. 1, the digits of an amount of money stored in the storage section 1 are read out as a data signal in which, for instance, the digits are sequentially arranged beginning with the least significant digit, and the data signal thus read out is compared with a signal representing the monetary denomination to be dispensed. As a result, in case that it is impossible to dispense the money for the amount of money registered with the monetary denomination designated that is, the amount of money is not an integer multiple of the amount of money of the unitary denomination to be dispensed, which will be correctly discriminated as an error in the registration of the amount of money.

In the device shown in FIG. 1, the error check signals HTt, HOt, HOh, HFt and HFh may be applied to an OR gate additionally provided, whereby to be produced therefrom as a single error check signal of the error check device.

Figure 5:
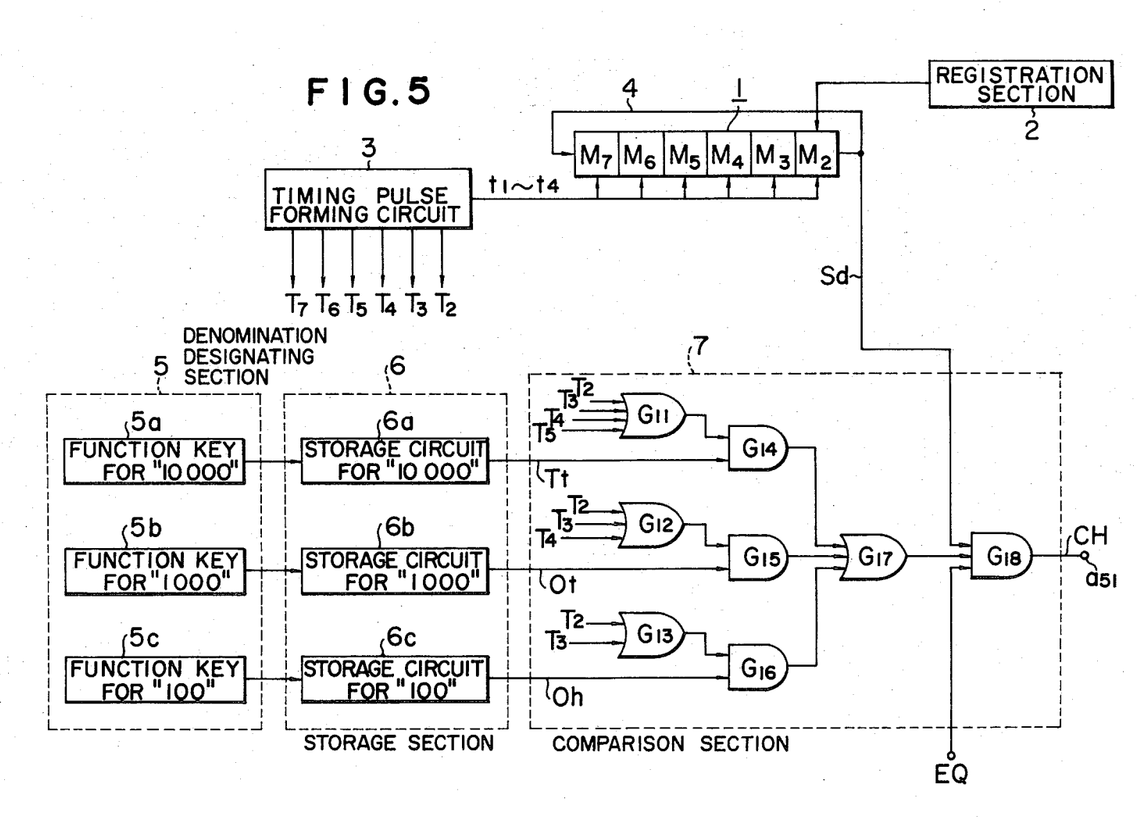
FIGS. 5 and 6 illustrate modifications of the error check circuit shown in FIG. 1.

One modification of the error check device of FIG. 1 is shown in FIG. 5. For simplification in description, the modification is so designed that it will operate dispensing money of the denominations "10,000," "1,000" and "100."

A comparison section 7 in FIG. 5 comprises on OR gate $G_{11}$ having four input terminals, an OR gate $G_{12}$ having three input terminals and an OR gate $G_{13}$ having two input terminals. These OR gates $G_{11}$, $G_{12}$ and $G_{13}$ are provided with respect to denomination designation signals Tt, Ot and Oh produced by a section 6 for storing monetary denominations designated, respectively. The timing pulses $T_2$, $T_3$, $T_4$ and $T_5$ are applied from the timing pulse forming circuit 3 described before to the gate $G_{11}$, the timing pulses $T_2$, $T_3$ and $T_4$, to the gate $G_{12}$, and the timing pulses $T_2$ and $T_3$, to the gate $G_{13}$. The outputs of these OR gates $G_{11}$, $G_{12}$ and $G_{13}$ are respectively applied to AND gates $G_{14}$, $G_{15}$ and $G_{16}$ each having two input terminals. The AND gates $G_{14}$, $G_{15}$ and $G_{16}$ receives the denomination designation signals Tt, Ot and Oh, respectively. The outputs of the gates $G_{14}$, $G_{15}$ and $G_{16}$ are applied through an OR gate $G_{17}$ to a first input terminal of an AND gate $G_{18}$. A second input terminal of the AND gate $G_{18}$ receives a data signal Sd from the storage section 1 described previously, while a third terminal of the AND gate $G_{18}$ receives the signal EQ representing completion of registration.

In the circuit shown in FIG. 5, when the signal Tt for designating the monetary denomination "10,000" is produced by the monetary denomination designating operation, a high level output is produced from the gate $G_{14}$ by the timing of the pulses $T_2$ through $T_5$. The high level output thus produced is applied through the gate $G_{17}$ to the gate $G_{18}$, thus opening the latter.

On the other hand, the digits of an amount of money stored in the storage section 1 by the operation for registering the amount of money are read out sequentially by beginning with its least significant digit. In this case, if the contents of these digits are not "0" in the decimal number system and each of the digits of the data signal Sd includes a bit of a high level, the gate $G_{18}$ will be opened. In addition, the signal EQ described above is applied to the gate $G_{18}$. In this case, the numerals for the places lower than a place of ten thousands of the amount of money registered are not "0" in the decimal number system at the timing instants of the pulses $T_2$ through $T_5$, a high level output will be produced, as an error check signal CH, by the AND gate $G_{18}$ its terminal $a_{51}$.

Also in the case where the denomination designation signal Ot or Oh is applied to the comparison section 7, the error check signal CH will be produced at the terminal $a_{51}$ of the AND gate $G_{18}$ in the same manner as described above.

Thus, it is also possible in the example illustrated in FIG. 5 that the digits of an amount of money stored in the storage section 1 are sequentially read out as a data signal Sd with the digits sequentially arranged, thereby to correctly discriminate an erroneous operation in registering the amount of money.

Figure 6:
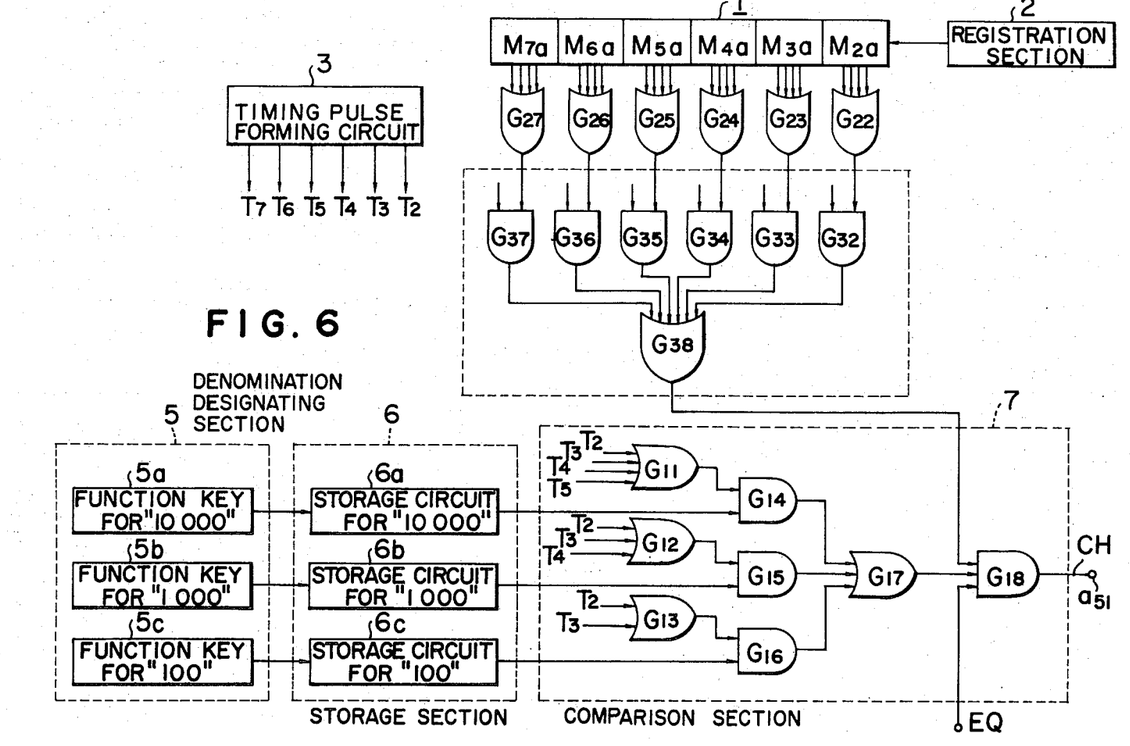

Illustrated in FIG. 6 is one modification of the error check device shown in FIG. 5. In this modification, its storage section 1, unlike the storage section 1 shown in FIG. 5, is a static registor with six digits, each having four bits.

Contents stored in the digits $M_{2a}$, $M_{3a}$, $M_{4a}$, $M_{5a}$, $M_{6a}$ and $M_{7a}$ are applied through OR gates $G_{22}$, $G_{23}$, $G_{24}$, $G_{25}$, $G_{26}$ and $G_{27}$ to input terminals of AND gates $G_{32}$, $G_{33}$, $G_{34}$, $G_{35}$, $G_{36}$ and $G_{37}$, respectively. Timing pulses $T_2$, $T_3$, $T_4$, $T_5$, $T_6$ and $T_7$ are sequentially applied from a timing pulse forming circuit 3 to the other input terminals of the AND gates $G_{32}$ through $G_{37}$ therefore, if, when the timing pulses $T_2$ through $T_7$ are sequentially applied to the gate $G_{32}$ through $G_{37}$, the contents in the digits $M_{2a}$ through $M_{7a}$ of the storage circuit 1 are not "0," high level outputs will be produced by the AND gates $G_{32}$ through $G_{37}$ in the order of the occurrence of the timing pulses $T_2$ through $T_7$. The high level outputs thus produced are sequentially applied through an OR gate $G_{38}$ to an AND gate $G_{18}$ of the comparison section in the same manner as in the case described with reference to FIG. 5.

Therefore, it is also possible in the example of FIG. 6 that the digits of an amounts of money stored in the storage section 1 are sequentially read out, as a data signal Sd with the digits sequentially arranged, by the timing of the pulses $T_2$ through $T_7$, thereby to correctly descriminate an erroneous operation in registering the amount of money.

In the examples illustrated with FIGS. 1 through 6, the digits of an amount of money stored in a storage section are read out as a data signal with the digits sequentially arranged and an erroneous operation in registering the amount of money is descriminated by the data signal.

Figure 7:
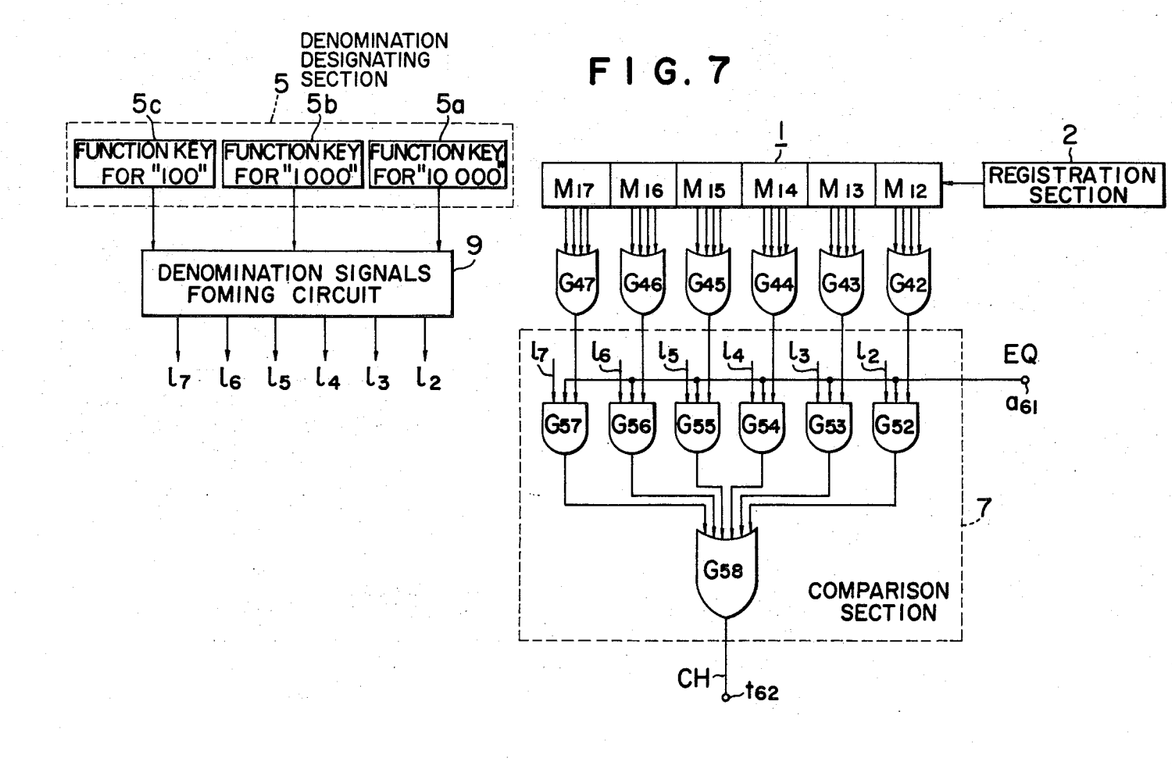
FIG. 7 is a block diagram illustrating another example of the error check circuit according to the invention.

An example of the error check device shown in FIG. 7 is somewhat different from the examples described above. In the error check device shown in FIG. 7, its storage section 1, like the storage section 1 in FIG. 6, is a static register having six digits $M_{12}$, $M_{13}$ $M_{14}$, $M_{15}$, $M_{16}$ and $M_{17}$. Contents stored in these six digits $M_{12}$ through $M_{17}$ are applied through OR gates $G_{42}$, $G_{43}$, $G_{44}$, $G_{45}$, $G_{46}$ and $G_{47}$ to AND gates $G_{52}$, $G_{53}$, $G_{54}$, $G_{55}$, $G_{56}$, and $G_{57}$, respectively. Outputs from the function key 5a, 5b and 5c in a denomination designating section 5 are applied to a circuit 9 for forming denomination designation signals. This circuit 9, for instance, comprises a diode matrix having three input lines and six output lines $l_2$, $l_3$, $l_4$, $l_5$, $l_6$ and $l_7$. When the function key 5a for the monetary denomination "10,000" is depressed, high level outputs will be produced on the output lines $l_2$ through $l_5$. When the function key 5b for the monetary denomination "1,000" is depressed, high level outputs will be produced on the output lines $l_2$, $l_3$ and $l_4$. When the function key 5c for the monetary denomination "100" is depressed, high level outputs will be produced on the output lines $l_2$ and $l_3$. The output lines $l_2$ through $l_7$ are respectively connected to input terminals of the AND gates $G_{52}$ through $G_{57}$ so that the gates $G_{52}$ through $G_{55}$, the gates $G_{52}$ through $G_{54}$, and the gates $G_{52}$ and $G_{53}$ are respectively opened by the designation of the monetary denominations "10,000," "1,000," and "100." Furthermore, the gates $G_{52}$ through $G_{57}$ receive a signal EQ representively the completion of registering an amount of money through a common terminal $a_{61}$.

In the error check device having the organization as described above, the gates $G_{52}$ through $G_{55}$ will be opened upon designation of, for instance, the monetary denomination "10,000," and then all the digits of an amount of money to be dispensed are respectively registered in the digits $M_{12}$ through $M_{17}$ of the storage section 1. Therefore, if the digits for the places lower than a place of ten thousands, for instance, the digit for a place of hundreds is not "0," a high level output will be produced by the OR gate $G_{44}$ corresponding to the digit and applied to the AND gate $G_{54}$ having three input terminals. After this when the signal EQ is applied to the comparison circuit 7 upon completion of the registration, a high level output will be produced by an AND gate having three input terminals and corresponding to the digit which is not "0," that is, the AND gate $G_{54}$ in this case. The high level output thus produced is delivered, as an error check signal CH, through the OR gate $G_{58}$ to its output terminal $a_{62}$.

In this connection, if there are available a plurality of digits which are not "0," a plurality of high level outputs can be simultaneously obtained from a plurality of AND gates having three input terminals which are correspondent to the plurality of digits, in the same manner as described above.

Thus, in the error check device shown in FIG. 7, the digits of the amount of money stored in the storage section are simultaneously read out as parallel data signals, which are used for correctly discriminating the erroneous registration of the amount of money.

In the case where it is desired to utilize the error check device illustrated in FIG. 7 for a money dispenser which will dispense money with the monetary denominations "5,000" and "500" in addition to the monetary denominations "10,000," "1,000" and "100," the outputs for the digits of "1,000" and "100" can be applied to the 5-0 discrimination circuit as shown in FIG. 4 in addition to the gate $G_{45}$ and $G_{44}$ so that a "5" discriminating output or a "1" discriminating output obtained from the 5-0 discrimination circuit is applied through an OR circuit to AND gates which are the same as the AND gates $G_{52}$ through $G_{57}$ in FIG. 7.

FIG. 7 illustrates the error check device in which the erroneous registration of an amount of money is discriminated by reading out the contents in all the digits of the storage section 1, but the discrimination of the erroneous registration can be achieved also by simultaneously reading out at least the contents in the digits of the register which are correspondent to the digits of the amount of money of the unitary denomination among the denominations to be dispensed.

We claim:

1. A device for checking an amount of money designated to be dispensed in an automatic money dispenser which dispenses said amount wherein the amount of money is checked to determine whether or not it can be dispensed from the money dispenser, and if it cannot be dispensed the device provides a check signal representative thereof, said device comprising:

designating means for designating an amount of money to be dispensed and providing a designating output signal representative thereof;

a first storage means operatively responsive to said designating means for storing said designating output signal from said designating means and providing timed sequential output signals representative thereof;

a second storage means for storing information fed thereto representative of unitary amounts of money each of a particular monetary denomination for dispensing the amount of money designated and providing corresponding unitary output signals representative thereof;

comparison means operatively associated with said second storage means and said first storage means for comparing said sequential output signals from said first storage means with said unitary output signals from said second storage means; and designation-completion signal-introducing means operatively associated with said comparison means for introducing a designation completion signal thereto upon completion of designating an amount of money in said designating means, said comparison means comparing said sequential output signal with corresponding ones of said unitary output signal when said designation-completion signal is introduced thereto, and allowing said dispenser to dispense said amount of money when said sequential output signals corresponding to an appropriate one of said unitary output signals, and when said sequential output signals do not correspond to an appropriate one of said unitary output signals said comparison means provides a check signal representative thereof.

2. A device as claimed in claim 1 in which, when an amount of money designated is dispensed in said first mode of dispensing money in a minimum number of pieces and a plurality of monetary denominations, said second storage means includes a monetary denomination storage section for storing the minimum unitary amount of money present in the plurality of monetary denomination selected and providing a third output signal representative thereof, said comparison means comparing said sequential output signals from said first storage means with said third output signal.

3. A device as claimed in claim 1 in which, when money is dispensed in said second mode of dispensing money according to monetary denominations designated, said device further comprises: denomination designating means operatively associated with said second storage means for introducing output signals thereof to said second storage means each representative of one of a plurality of monetary denominations designated by said denomination designating means, and upon designation of said monetary denomination by said denomination designating means, said output signals are applied to said second storage means whereby said second storage means applies second output signals to said comparison means representative of unitary amounts of money each of a particular one of said monetary denominations.

4. A device as claimed in claim 1 in which said designated amount of money is stored in said first storage means and displayed in digit form each digit being sequentially read out by means of said sequential signals, and compared in said comparison means with each unitary denomination signal representative of a particular unitary denomination stored in said second storage means.

5. A device as claimed in claim 4 in which said first storage means is a dynamic register provided with a registration section having ten keys and a timing pulse forming circuit thereby dynamically storing said amount of money, and said second storage means comprises a plurality of storage circuits, each storing a monetary denomination designating signal representative of a monetary denomination designated by a function key in operative association therewith, and said comparison means comprises comparison circuits each producing a check signal when the amount of money stored in said first storage means is incompatible with that stored in a corresponding one of said plurality of storage circuits.

6. A device as claimed in claim 4 in which said comparison means comprises: OR gates which are provided corresponding to the number of monetary denominations stored therein, said OR gates receiving timing pulses from said timing pulse forming circuit; AND gates controlled by an output of each of said OR gates and said unitary output signals from said storage means, an OR gate for receiving outputs from said AND gates; and an AND gate controlled by an output from the latter OR gate, said sequential signals representing each digit in the amount of money stored in said first storage means, and said designation completion signal.

7. A device as claimed in claim 1 in which said designated amount of money stored in said first storage means is displayed in digit form each digit being simultaneously read out thereby being simultaneously compared in said comparison means with the contents of the amount of money of said unitary denomination up to a number of digits corresponding to at least the number of digits which comprise the amount of money in said unitary denomination.

8. A device as claimed in claim 7 in which said first storage means is a static register, which displays the amount of money to be dispensed in digit form each digit being read out therefrom simultaneously and introduced to respective ones of a plurality of first OR gates each producing an output signal representative thereof and a plurality of first AND gates each one being respectively controlled by the output signal of one of said first OR gates connected thereto and timing pulses from a timing pulse forming circuit operatively associated therewith, each of said plurality of AND gates being connected to a second OR gate which thereby produces signals representing each of said digits in said amount of money, and said comparison means comprises a plurality of third OR gates the number of which corresponds to the number of monetary denominations in said second storage means, each said third OR gate receiving timing pulses from said timing pulse forming circuit simultaneously with those fed to said first AND gates, second AND gates corresponding to the number of said third OR gates respectively controlled by outputs of said third OR gates and said unitary output signals from said second storage means, a fourth OR gate for receiving outputs from said second AND gates connected thereto, and a third AND gate controlled by an output from said fourth OR gate, said signals representing each digit in the amount of money stored in said first storage means and said designation-completion signal.

9. A device as claimed in claim 8 in which said comparison means comprises AND gates the number of which corresponds to the number of digits of the amount of money to be dispensed and an OR gate for receiving outputs of said AND gates, said AND gates being controlled by said signals representing each digit in the amount of money stored in said first storage means, said unitary output signals and said designation-completion signals.

* * * * *